B. F., W. P. & J. RARICK.
Trash Gatherer.
No. 202,051. Patented April 2, 1878.
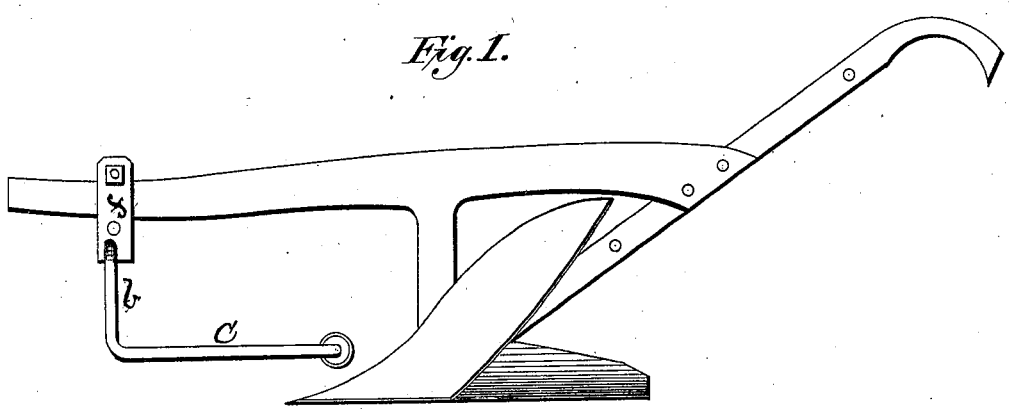
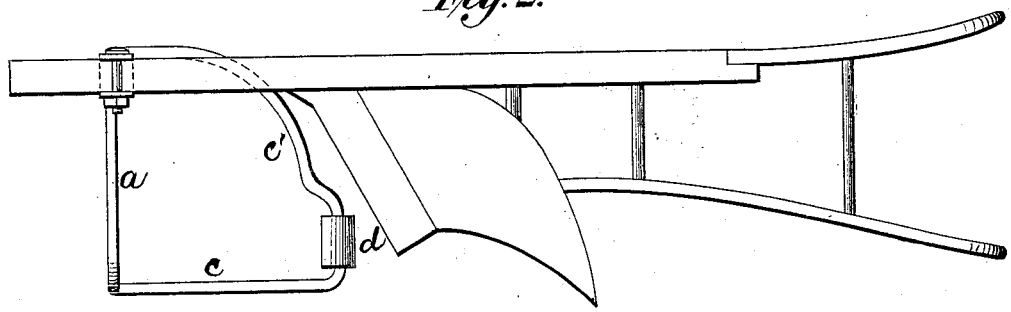

UNITED STATES PATENT OFFICE.

BENJAMIN F. RARICK, WILLIAM P. RARICK, AND JONAS RARICK, OF LINCOLN TOWNSHIP, REPUBLIC COUNTY, KANSAS.

IMPROVEMENT IN TRASH-GATHERERS.

Specification forming part of Letters Patent No. 202,051, dated April 2, 1878; application filed August 13, 1877.

*To all whom it may concern:*

Be it known that we, BENJAMIN F. RARICK, WILLIAM P. RARICK, and JONAS RARICK, of Lincoln township, in Republic county, in the State of Kansas, have invented certain new and useful Improvements in Trash-Gathering Apparatus, of which the following is a specification:

Our invention consists in certain devices, fully described hereinafter, to be operated in connection with a plow for the purpose of gathering weeds and other trash, and causing the same, when the plow is operated, to be buried under the surface of the ground.

To enable others, who may desire, to manufacture or use our invention, we will proceed to describe it.

We form, of iron or any other suitable substance, the horizontal cross-bar $a$, (shown in the accompanying drawing of our invention,) the said horizontal cross-bar $a$ having connected therewith the clamp $f$, by which it may be attached to the beam of a plow, and adjusted to cause the invention to operate properly; the vertical bar $b$, connected with the horizontal cross-bar $a$; the horizontal bar $c$, connected with the vertical bar $b$; the curved bar $c'$, carrying thereon the roller $d$; and the vertical bar $b'$, connected with the curved bar $c'$.

When our said invention is attached to the beam of a plow, and the plow has given to it a forward motion, it will be observed that all weeds, or trash, or corn-stalks, or other substances above the ground in front of and in the line of motion of the plow, will be brought in contact with and under the horizontal cross-bar $a$, and brought between the horizontal bar $c$ and the curved bar $c'$, and the forward motion of the plow still continuing, the curved bar $c'$ forces the weeds, trash, corn-stalks, or other substances toward the roller $d$, while at the same time the horizontal bar $c$ prevents the same escaping and falling upon the plowed land. The weeds, trash, corn-stalks, and other substances will, by the action of the roller $d$, be pressed into the furrow, or so near the surface of the ground which is about being turned by the mold-board that, as the plow still progresses farther forward, it will cause the same to turn over with and be under the ground turned by the plow.

What we claim as our invention is—

A trash-gatherer formed by the horizontal cross-bar $a$, the vertical bars $b$ $b'$, the horizontal bar $c$, and the curved bar $c'$, carrying the roller $d$ and the clamp $f$, all constructed substantially as shown and described, and for the purpose set forth.

BENJAMIN F. RARICK.
WILLIAM P. RARICK.
JONAS RARICK.

Witnesses:
F. W. CRANS,
L. J. CRANS.